United States Patent
Kim

(10) Patent No.: US 12,222,017 B2
(45) Date of Patent: Feb. 11, 2025

(54) AIR SPRING FOR CAB OF HEAVY TRUCK WITH AUTOMATIC HEIGHT ADJUSTMENT

(71) Applicants: Hyundai Motor Company, Seoul (KR); Kia Corporation, Seoul (KR)

(72) Inventor: Dae-Su Kim, Jeonju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 509 days.

(21) Appl. No.: 17/570,047

(22) Filed: Jan. 6, 2022

(65) Prior Publication Data

US 2023/0064527 A1     Mar. 2, 2023

(30) Foreign Application Priority Data

Aug. 31, 2021   (KR) .......................... 10-2021-0115520

(51) Int. Cl.
| | |
|---|---|
| *F16F 9/22* | (2006.01) |
| *B62D 33/10* | (2006.01) |
| *F16F 9/32* | (2006.01) |
| *F16F 9/43* | (2006.01) |

(52) U.S. Cl.
CPC ............... *F16F 9/22* (2013.01); *B62D 33/10* (2013.01); *F16F 9/3221* (2013.01); *F16F 9/43* (2013.01)

(58) Field of Classification Search
CPC ........ F16F 9/22; F16F 9/34; F16F 9/36; F16F 9/43; F16F 9/44; F16F 9/46; F16F 9/3221; B62D 33/10
USPC ........ 267/64.11–64.28, 122, 221; 280/5.515, 280/124.16, 124.157–124.163
See application file for complete search history.

(56) References Cited

U.S. PATENT DOCUMENTS

| | | | | |
|---|---|---|---|---|
| 3,000,624 | A * | 9/1961 | Cislo ...................... | F16F 9/084 280/DIG. 1 |
| 5,669,597 | A * | 9/1997 | Rittstieg .............. | B60G 17/044 267/64.21 |
| 5,921,532 | A * | 7/1999 | Pierce ................ | B60G 17/0416 267/64.19 |
| 6,332,624 | B1 * | 12/2001 | Gilsdorf .................... | F16F 9/05 280/124.16 |
| 6,923,433 | B2 * | 8/2005 | Gross .................... | B60G 15/14 267/64.11 |
| 7,150,450 | B2 * | 12/2006 | Bell ....................... | B60G 11/27 267/64.21 |

FOREIGN PATENT DOCUMENTS

| | | | |
|---|---|---|---|
| KR | 10-2005-0028772 A | 3/2005 | |
| WO | WO-2015114134 A1 * | 8/2015 | ............. B60G 15/12 |

* cited by examiner

*Primary Examiner* — Christopher P Schwartz
(74) *Attorney, Agent, or Firm* — Morgan, Lewis & Bockius LLP

(57) ABSTRACT

An air spring for a cab of a heavy truck with automatic height adjustment, in which the air spring is provided between the cab and a frame of a truck and supports the cab with a pressure of air filling in the air spring, includes a canister in which an internal space is formed, and a piston movably mounted in the internal space of the canister and configured to ascend and descend relative to the canister. A port opening unit is provided adjacent to an intake port and an exhaust port of the piston, respectively. When the cab ascends or descends, each of the port opening units comes into contact with guides, each having an inclined surface, formed in the canister to open either the intake port or the exhaust port.

20 Claims, 12 Drawing Sheets

AIR SPRING FOR CAB OF HEAVY TRUCK WITH AUTOMATIC HEIGHT ADJUSTMENT

CROSS-REFERENCE(S) TO RELATED APPLICATIONS

The present application claims priority to Korean Patent Application No. 10-2021-0115520, filed on Aug. 31, 2021, the entire contents of which is incorporated herein for all purposes by this reference.

BACKGROUND OF PRESENT INVENTION

Field of Present Invention

The present invention relates to an air spring for a cab of a heavy truck, which cushions a cab for a driver accommodated in the heavy truck, and more particularly, to an air spring for a cab of a heavy truck with automatic height adjustment, which is located in the air spring and controls an internal pressure of the air spring to maintain a constant height when the cab ascends or descends beyond a predetermined range.

Description of Related Art

In a heavy truck, a cab for a driver in the heavy truck is provided in a form of being placed on an upper portion of a frame.

A front end portion of a cab 130 is hinged to a front end portion of a frame 140, as shown in FIG. 1 and the cab 130 is supported by a suspension including an air spring 100.

The air spring 100 applies a constant pressure in a space formed by a canister 110 and a piston 120 to make the cab 130 have a constant height.

As shown in FIG. 1, the air spring 100 should be provided with a leveling valve 150 configured to supply or discharge air in or from the air spring 100 on one side of the air spring 100.

A cab hinge bracket 141 of the cab 130 is provided on the frame 140 of a vehicle, a lower end portion of the rod mounting bracket 142 is fixed inside a cab hinge bracket 141, and an upper end portion of the rod mounting bracket 142 is connected to a lower end portion of a leveling rod 151. An upper end portion of the leveling rod 151 is hinged to a valve lever 152 extending laterally from the leveling valve 150 provided on an upper bracket 143.

The air spring 100 includes the canister 110 and the piston 120 and is filled therein with air to serve a buffering function.

When the cab 130 is positioned at a normal height (see FIG. 3A), the valve lever 152 blocks a passage communicating with the air spring 100 in the leveling valve 150 to maintain the normal height of the cab 130.

When the cab 130 descends from the normal height (see to FIG. 3B), a front end portion of the valve lever 152 descends to open a passage through which air is supplied toward the air spring 100 within the leveling valve 150 and to supply air to the air spring 100, and thus the cab 130 is raised.

On the other hand, when the cab 130 ascends (see FIG. 3C), the front end portion of the valve lever 152 ascends to open a passage through which the air is discharged from the air spring 100 within the leveling valve 150, and thus the cab 130 is lowered.

However, according to the related art as described above, due to a structure in which the leveling valve 150, the leveling rod 151, the rod mounting bracket 142, and the leveling rod 151 are link-connected using bolts, the number of parts is large to cause an increase in production cost.

Furthermore, since movable parts such as the leveling rod 151 and the valve lever 152 are exposed to the outside, a malfunction frequently occurs due to exposure to foreign materials.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY OF PRESENT INVENTION

Various aspects of the present invention are directed to providing an air spring for a cab of a heavy truck with automatic height adjustment, which is configured for maintaining a constant height of a cab without exposing a configuration for introducing air into the air spring or discharging the air therefrom.

Other objects and advantages of the present invention may be understood by the following description and become apparent with reference to the exemplary embodiments of the present invention. Further, it is obvious to those skilled in the art to which various exemplary embodiments of the present invention pertains that the objects and advantages of the present invention may be realized by the means as claimed and combinations thereof.

In accordance with various exemplary embodiments of the present invention, there is provided an air spring for a cab of a heavy truck with automatic height adjustment, which may be provided between a cab and a frame of a truck and may support the cab with a pressure of air filling in the air spring, including a canister in which a space may be formed, and a piston movably mounted in the internal space of the canister and configured to ascend and descend relative to the canister, wherein, a port opening unit may be provided adjacent to an intake port and an exhaust port of the piston, respectively, and when the cab ascends and descends, the port opening unit may come into contact with a guide on which an inclined surface is formed in the canister to open either the intake port or the exhaust port.

The guide may include an intake guide on which an intake guide surface inclined outward the canister toward a lower side of the canister may be formed, and an exhaust guide on which an exhaust guide surface inclined inward the canister toward the lower side of the canister, wherein the intake guide surface may be located at a position which is higher than a position of the exhaust guide surface.

A first support surface formed downward from a lower end portion of the intake guide surface in an ascending and descending direction of the piston may be formed in the intake guide, and a second support surface formed upwards from an upper end portion of the exhaust guide in an ascending and descending direction of the piston may be formed in the exhaust guide.

A lower end portion of the intake guide surface may be spaced from an upper end portion of the exhaust guide surface with a predetermined distance.

The port opening unit may be provided above each of the intake port and the exhaust port.

The port opening units respectively provided on the intake port and the exhaust port side may be located at a same height.

A holder configured to accommodate a corresponding port opening unit may be formed in the piston to intersect the intake port and the exhaust port.

Each of the port opening units may include a rod which is slidably provided in inside of the holder and in which a communication hole configured for fluidically communicating with the intake port or the exhaust port according to the sliding position is formed, a roller disposed at an end portion of the rod and configured to come into contact with the guide, and a spring elastically support the roller toward the guide.

The intake port and the exhaust port may be formed in the piston in an ascending and descending direction of the piston, and each of the port opening units may be provided to be adjacent to an upper end portion of the piston.

The intake guide may be spaced from the exhaust guide by a predetermined interval.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
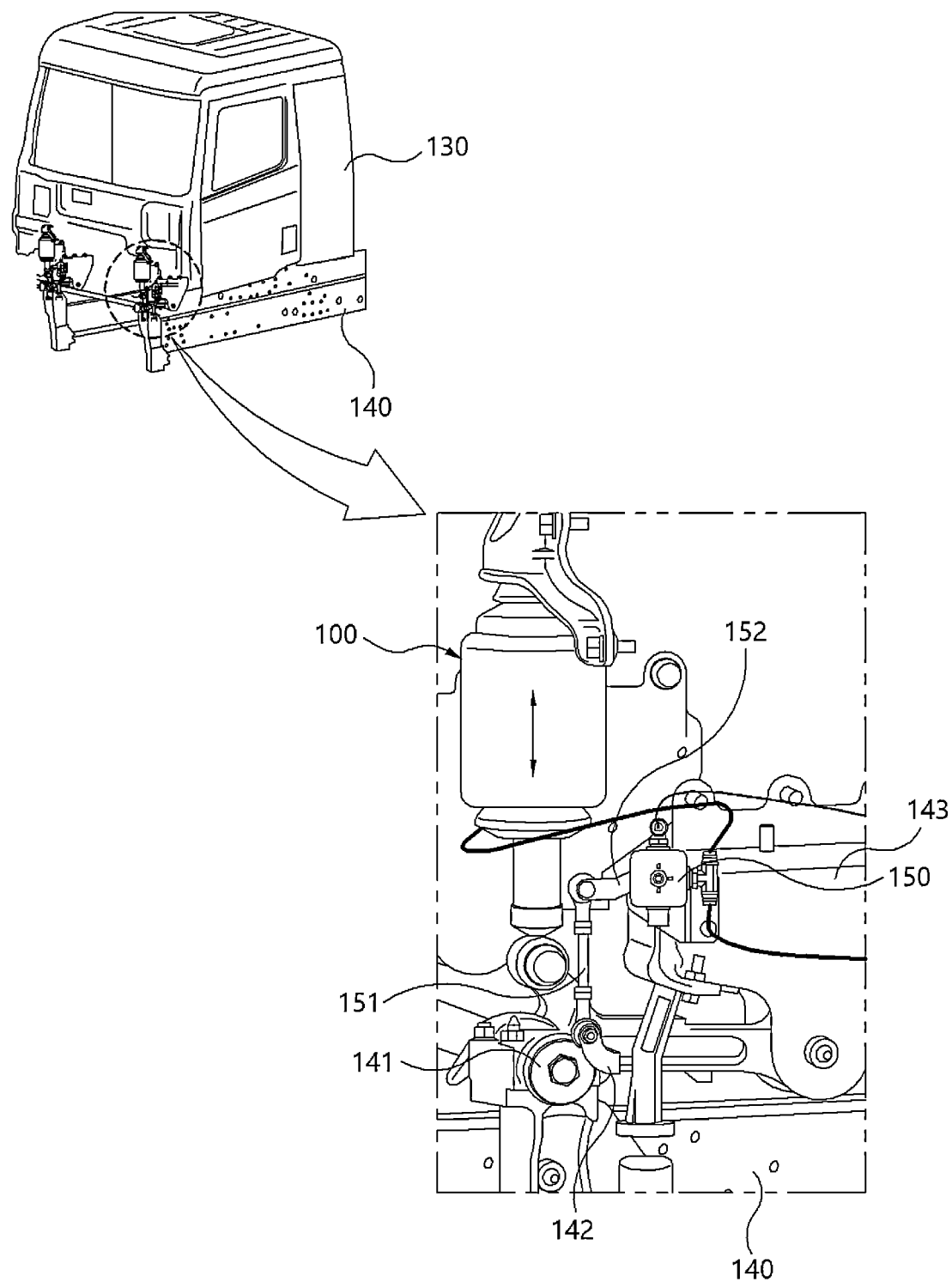
FIG. 1 is a perspective view exemplarily illustrating a state in which a cab air spring is provided in a truck according to the related art.
Figure 2:
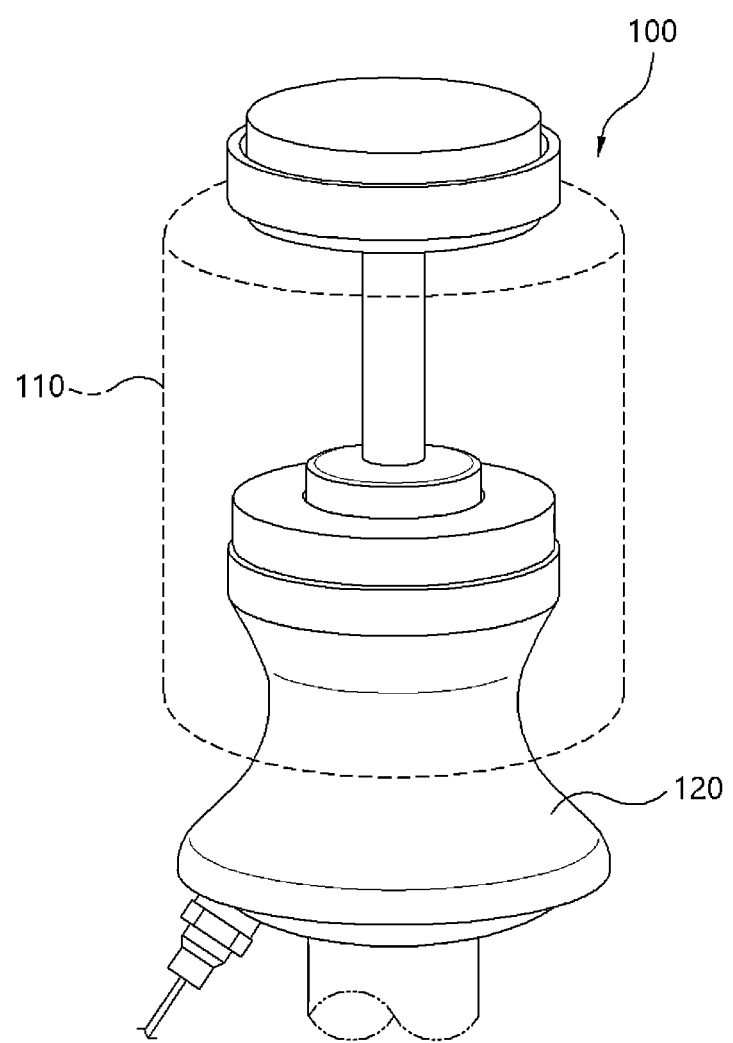
FIG. 2 is a projective view exemplarily illustrating a structure of the cab air spring according to the related art.
Figure 3A:
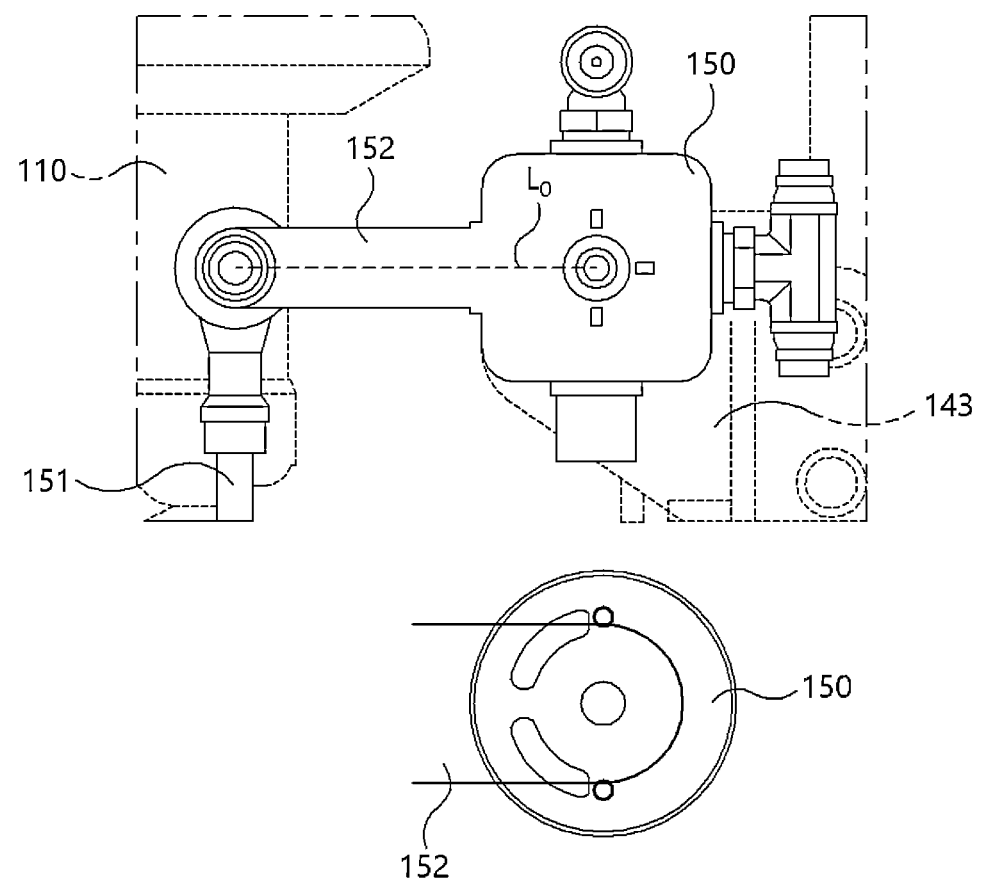
FIG. 3A, FIG. 3B and FIG. 3C are schematic diagrams illustrating a state in which air is supplied or discharged according to an ascending or descending of the cab according to the related art.
Figure 3B:
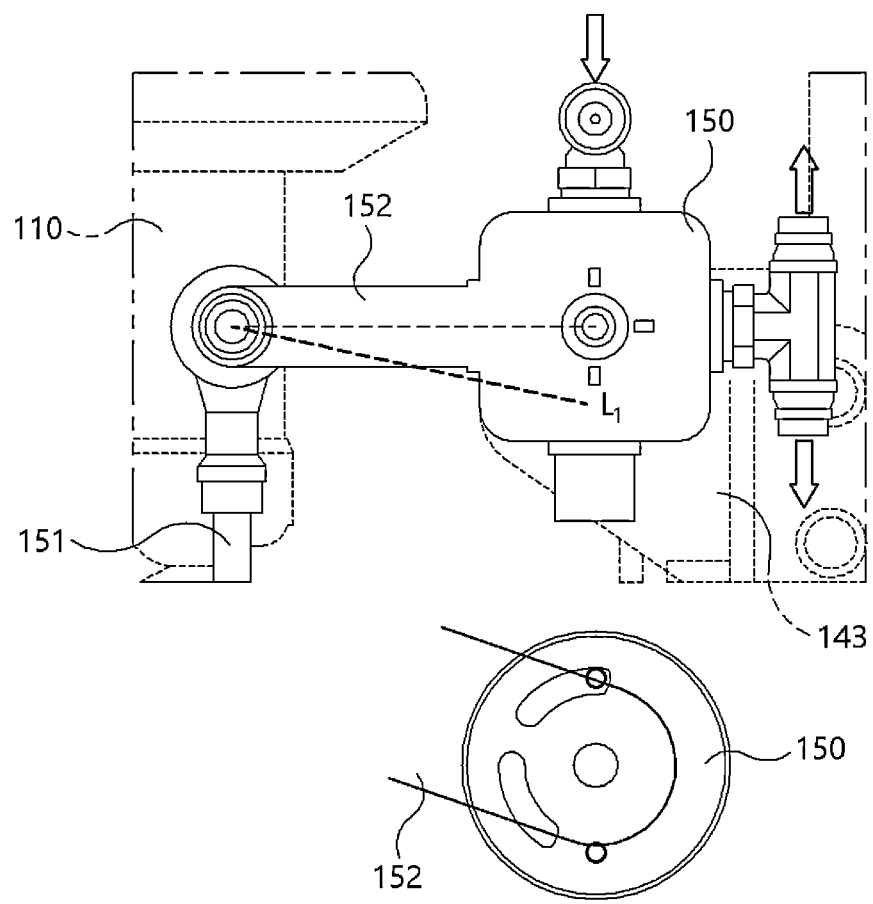
Figure 3C:
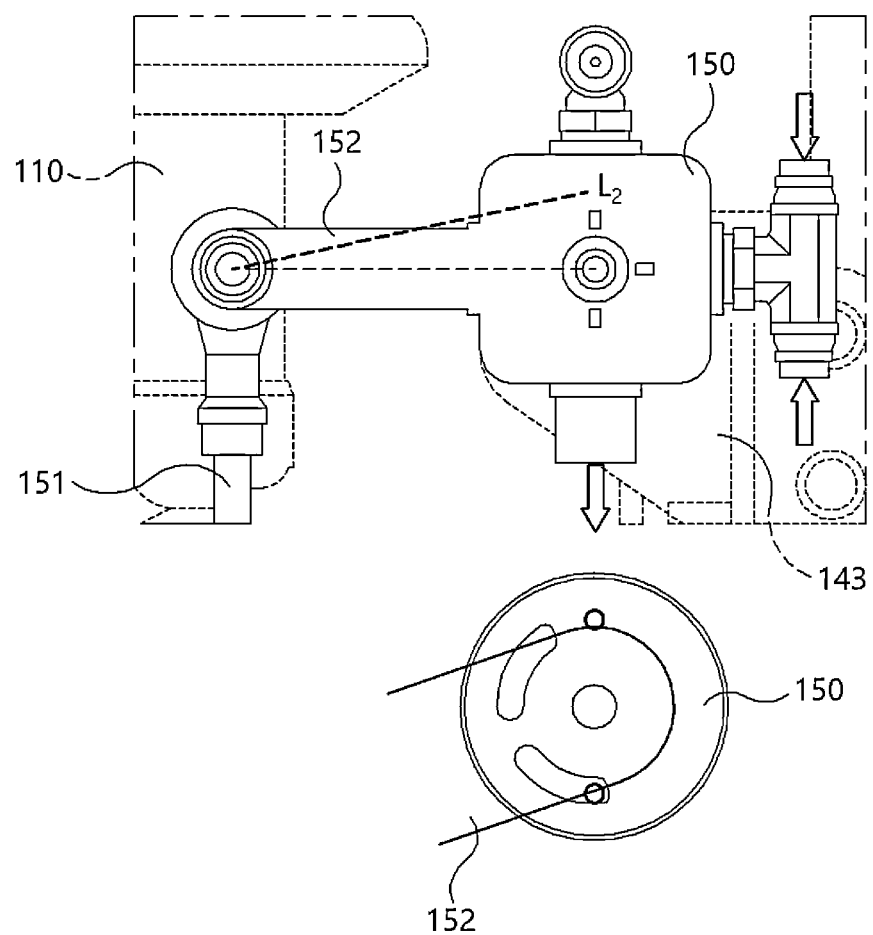
Figure 4:
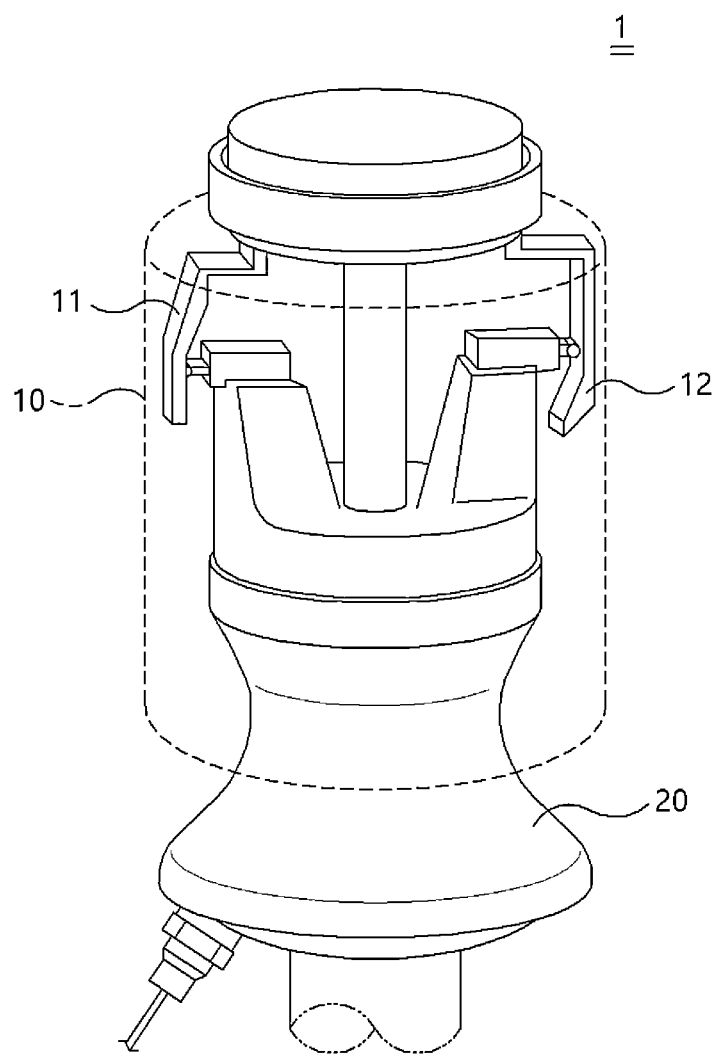
FIG. 4 is a projective view exemplarily illustrating an air spring for a cab of a heavy truck with automatic height adjustment according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, air spring for a cab of a heavy truck with automatic height adjustment according to various exemplary embodiments of the present invention will be described in detail with reference to the accompanying drawings.

In an air spring for a cab of a heavy truck with automatic height adjustment according to various exemplary embodiments of the present invention, an air spring 1, which may be provided between a cab and a frame of a truck and supports the cab due to a pressure of air filling in the air spring 1, may include a canister 10 in which a space may be formed, and a piston 20 mounted in inside of the canister 10 and configured to ascend and descend relative to the canister 10. A port opening unit 30 may be provided adjacent to an intake port 21 and an exhaust port 22 formed in the piston 20, respectively. In the exemplary embodiment of the present invention, each of the port opening units 30 may have the same structure. When the cab ascends or descends, each of the port opening units 30 may come into contact with guides 11 and 12, each having an inclined surface, formed in the canister 10 to open either the intake port 21 or the exhaust port 22.

The cab in which an occupant rides in the truck is located above the frame, and the air spring 1 may be provided between the cab and the frame, may maintain the cab at an appropriate position, and prevents a vibration due to traveling from being transferred to the occupant.

The canister 10 may be formed in a form of a barrel to accommodate components, which will be described below, in inside of the canister 10.

The piston 20 may be inserted upwards from a lower end portion of the canister 10 and may block the canister 10.

The cab may be supported by a pressure of air filling in a space formed by the canister 10 and the piston 20. Furthermore, an intake port 21 configured to introduce the pressurized air into the air spring 1 and an exhaust port 22 configured to discharge the air in the air spring 1 to the outside are formed in the piston 20. The intake port 21 and the exhaust port 22 are formed substantially in an ascending and descending direction of the canister 10, and the intake port 21 or the exhaust port 22 may be opened or closed according to the pressure in the air spring 1.

In various exemplary embodiments of the present invention, the pressure of the air spring 1 may be maintained within a predetermined range, and thus the cab may be automatically maintained at a constant height.

To the present end, in various exemplary embodiments of the present invention, an intake guide 11 and an exhaust guide 12 may be provided on the canister 10, and the port opening unit 30 operated by the intake guide 11 and the exhaust guide 12 may be provided in the piston 20.

When the canister 10 ascends or descends according to an internal pressure of the air spring 1, each of the port opening units 30 may operate according to profiles of the intake guide 11 and the exhaust guide 12 to open the intake port 21 or the exhaust port 22. When the internal pressure of the air spring 1 is low and the cab descends, the pressurized air from the outside thereof is introduced through the intake port 21 to the air spring 1, and when the internal pressure of the air spring 1 is high and the cab ascends, the air in the air spring 1 is discharged to the outside through the exhaust port 22. Accordingly, the pressure of the air spring 1 may be maintained within an appropriate range, and thus the cab may be also maintained at an appropriate height.

A profile may be formed on an internal surface of each of the intake guide 11 and the exhaust guide 12 to allow the port opening unit 30 to be operated in conjunction with the ascending and descending of the canister 10.

When the canister 10 descends, the intake guide 11 may allow the port opening unit 30 provided at the intake port 21 to be operated. To the present end, an intake guide surface 11a formed as an inclined surface and a first support surface 11b formed as a vertical surface may be sequentially formed from the top portion to the bottom portion of the intake guide 11. The intake guide surface 11a may be formed as an inclined surface which may be inclined outward toward the canister 10 from the top portion to the bottom. Furthermore, the first support surface 11b may be formed downward from a lower end portion of the intake guide surface 11a. The first support surface 11b may not be formed to be inclined and may be formed in the same direction as the ascending and descending direction of the canister 10.

When the canister 10 ascends, the exhaust guide 12 may allow the port opening unit 30 provided at the exhaust port 22 to be operated. To the present end, an exhaust guide surface 12a formed as an inclined surface and a second support surface 12b formed as a vertical surface may be sequentially formed from the bottom the top portion of the exhaust guide 12. The exhaust guide surface 12a may be formed as an inclined surface which may be inclined inward toward the canister 10 from the top portion to the bottom. The second support surface 12b may be formed upwards from an upper end portion of the exhaust guide surface 12a. Even in the exhaust guide 12, the second support surface 12b may not be formed to be inclined and may be formed in the same direction as the ascending and descending direction of the canister 10.

The intake guide surface 11a and the first support surface 11b formed in the intake guide 11, and the exhaust guide surface 12a and the second support surface 12b formed in the exhaust guide 12 may form profiles by which the port opening unit 30 may be opened or blocked according to the ascending or descending of the canister 10 on the intake guide 11 and the exhaust guide 12.

The intake guide 11 may be formed to be spaced from the exhaust guide 12. For example, the intake guide 11 may be formed to be spaced from the exhaust guide 12 by an interval of 180 degrees.

Each of the port opening units 30 may be provided to be adjacent to an upper end portion of the piston 20 to open or block the intake port 21 and the exhaust port 22 according to the internal pressure of the air spring 1.

Each of the port opening units 30 may be formed to have the same structure and may be provided in each of a holder 23 formed in the piston 20 to open and block the intake port 21 and the exhaust port 22. In the instant case, each of the port opening units 30 may be preferably located at a same height.

Each of the port opening units 30 may include a rod 31 configured to open and block the intake port 21 or the exhaust port 22, a roller 32 configured to come into contact with the intake guide 11 or the exhaust guide 12 at an end portion of the rod 31, and a spring 33 configured to elastically support the roller 32 to be pressed against the intake guide 11 or the exhaust guide 12.

The rod 31 may be slidably provided in the holder 23 formed in the piston 20. The holder 23 may be formed at a position adjacent to the upper end portion of the piston 20 to accommodate the rod 31 in a direction perpendicular to the ascending and descending direction of the canister 10. Accordingly, the rod 31 may be slidably provided in the holder 23.

A communication hole 31a configured to communicate with the intake port 21 or the exhaust port 22 according to a sliding position of the rod 31 may be formed in the rod 31. The rod 31 may block the intake port 21 or the exhaust port 22 in most sections. However, when the communication hole 31a is located to coincide with the intake port 21 or the exhaust port 22, the communication hole 31a may communicate with the intake port 21 or the exhaust port 22. When the communication hole 31a communicates with the intake port 21, pressurized air may be introduced into the air spring 1 from the outside, and when the communication hole 31a communicates with the exhaust port 22, the air in the air spring 1 may be discharged to the outside.

The roller 32 may be located at an end portion of the rod 31 and may come into contact with the intake guide 11 or the exhaust guide 12. Since the roller 32 is rotatably provided on an external end portion of the rod 31, when the intake guide 11 or the exhaust guide 12 ascends and descends together with the canister 10, the roller 32 may move the rod 31 according to the profile of an internal surface of the intake guide 11 or the exhaust guide 12.

The spring 33 may elastically support the rod 31 and the roller 32 to be pressed against the intake guide 11 or the exhaust guide 12 in the holder 23. Since the spring 33 is provided on the innermost side of the holder 23, the spring 33 elastically supports the rod 31 and the roller 32 to be pressed to the outside, so that the roller 32 may be pressed against the intake guide 11 or the exhaust guide 12.

Meanwhile, a stopper 23a may be formed in the holder 23 to prevent the rod 31 from being separated from the holder 23.

When the port opening unit 30 is located between a lower end portion of the intake guide surface 11a in the intake guide 11 and an upper end portion of the exhaust guide surface 12a in the exhaust guide 12, the port opening unit 30 may simultaneously block the intake port 21 and the exhaust port 22, respectively.

Figure 5:
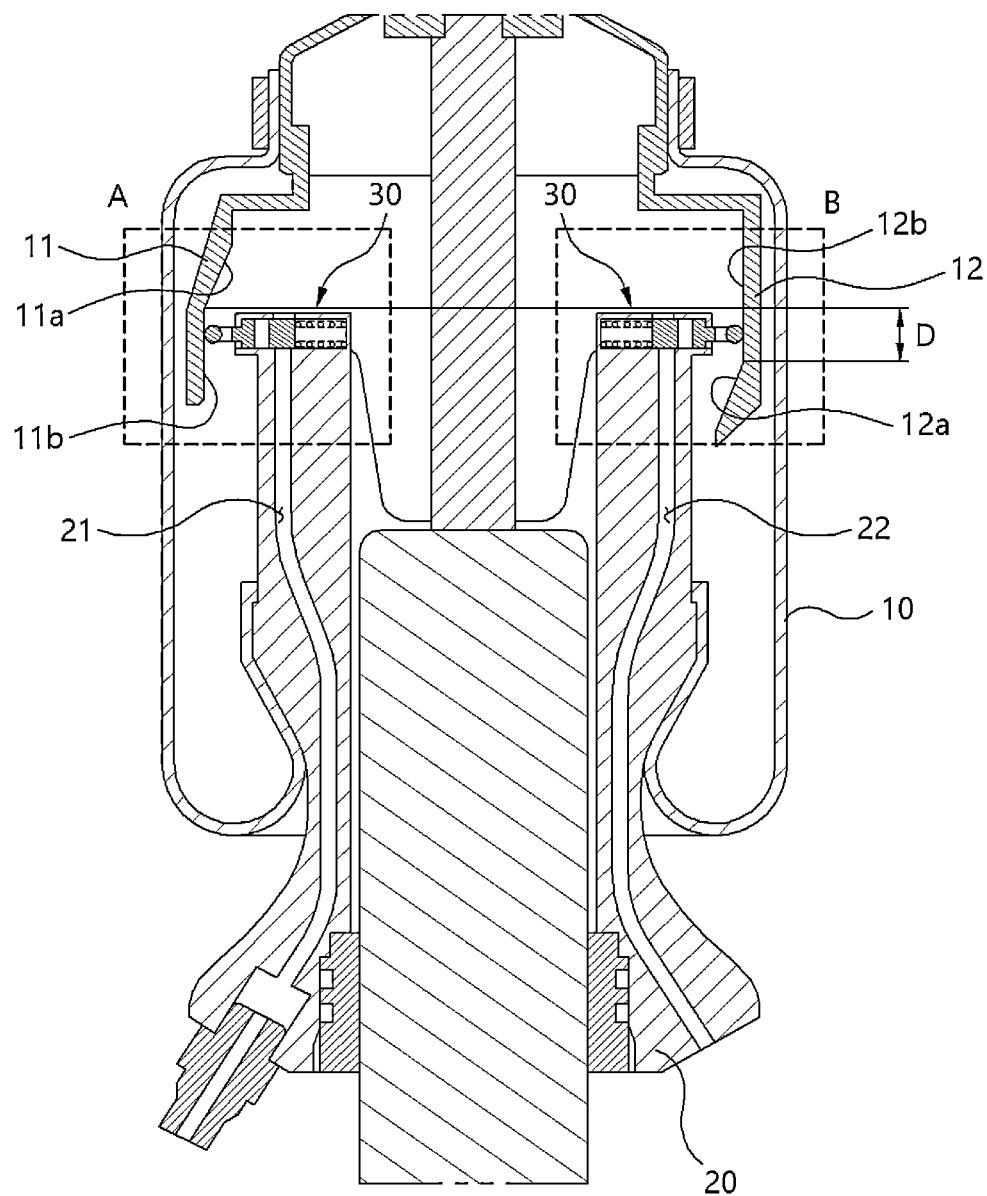
FIG. 5 is a cross-sectional view exemplarily illustrating the air spring for a cab of a heavy truck with automatic height adjustment according to various exemplary embodiments of the present invention.
Figure 6:
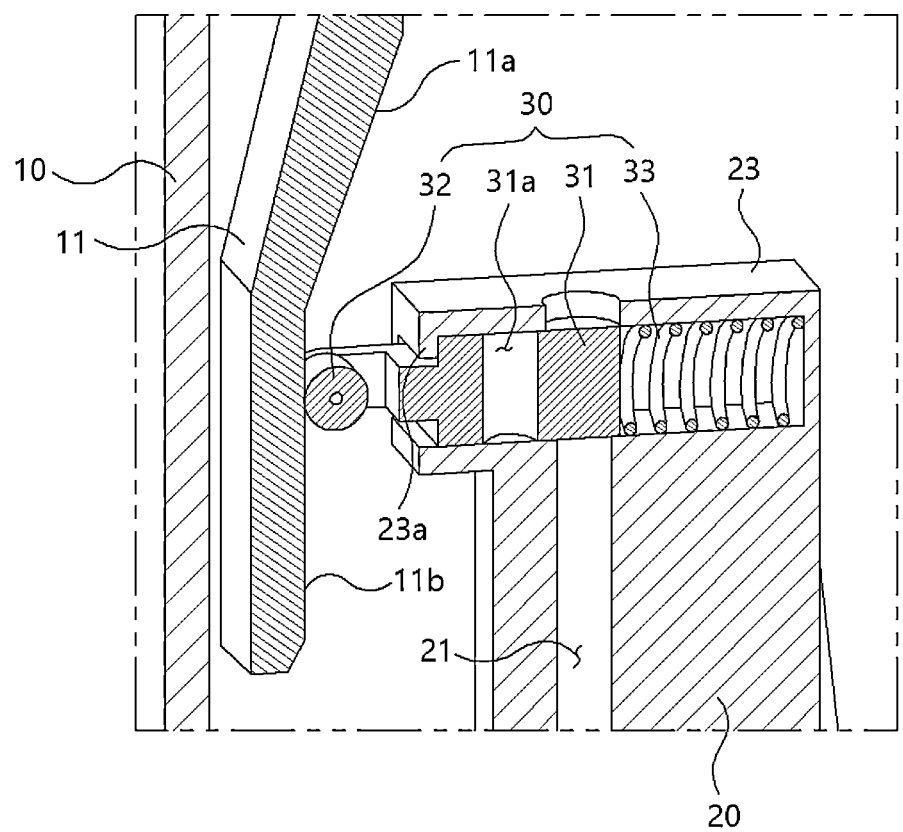
FIG. 6 is an enlarged view of Portion one of FIG. 5.
Figure 7:
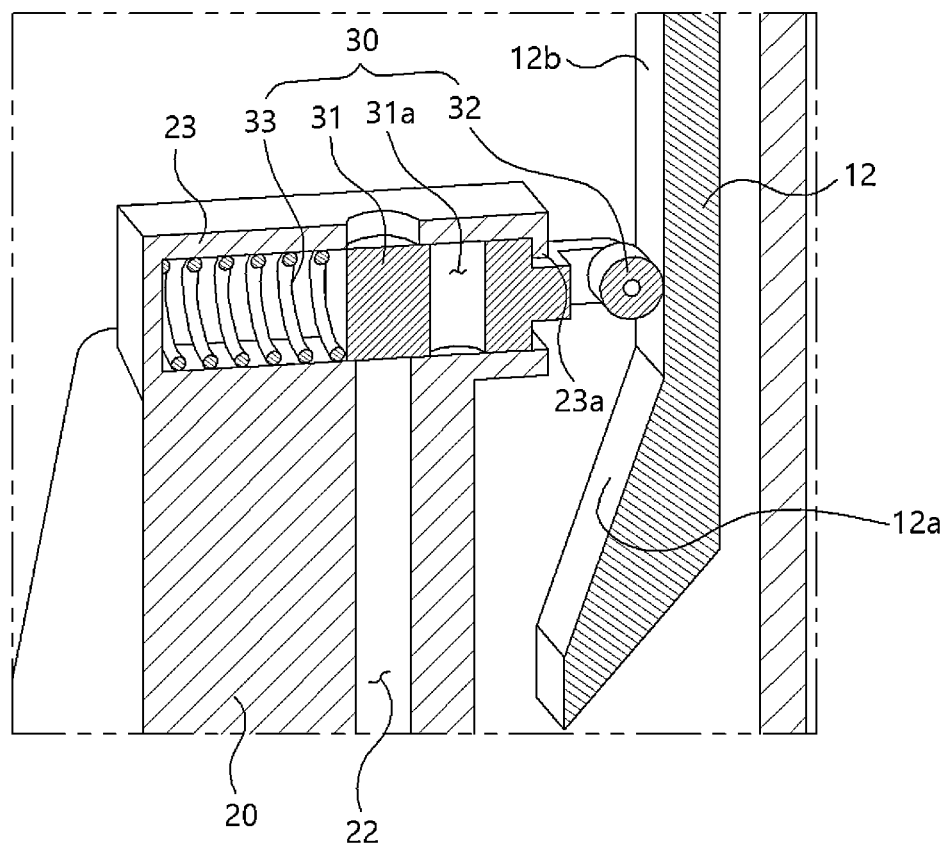
FIG. 7 is an enlarged view of Portion B of FIG. 5.
Figure 8A:
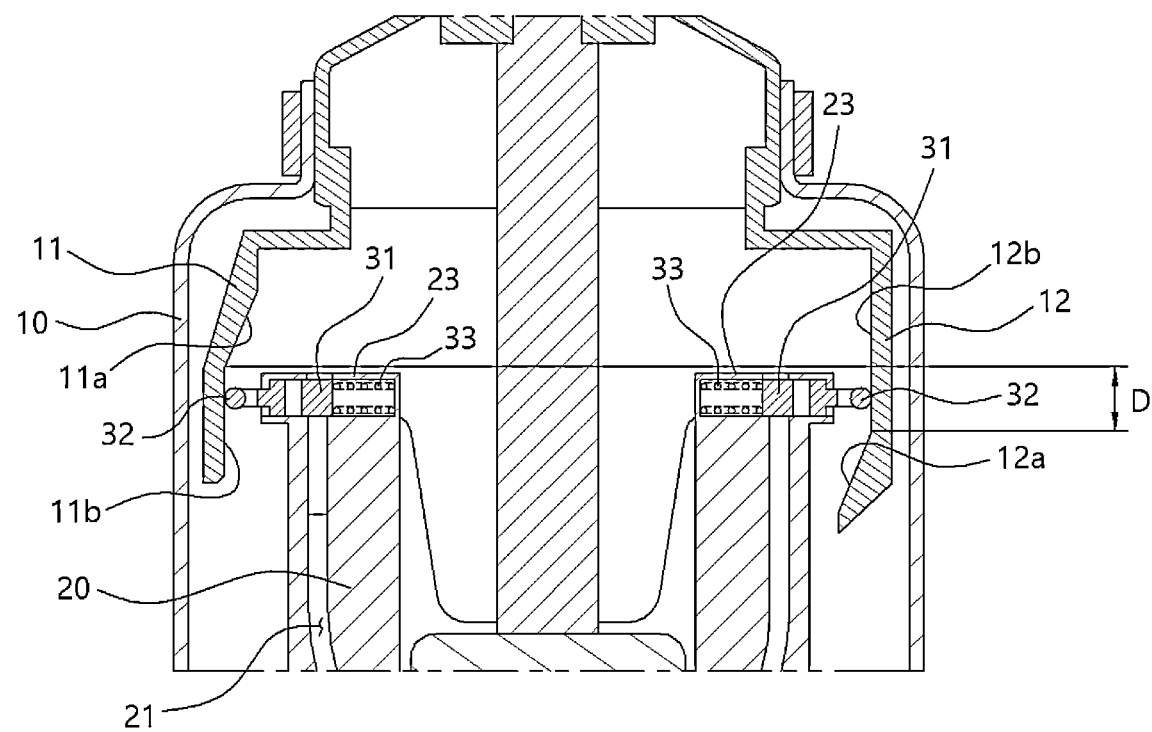
FIG. 8A, FIG. 8B and FIG. 8C are cross-sectional views exemplarily illustrating a state in which the air spring for a cab of a heavy truck with automatic height adjustment operates depending on a height of the cab according to various exemplary embodiments of the present invention.

When the inside of the air spring 1 is at an appropriate pressure and thus the cab is located at an appropriate height, the port opening unit 30 may be located between the lower end portion of the intake guide surface 11a in the intake guide 11 and the upper end portion of the exhaust guide surface 12a in the exhaust guide 12, respectively (section D in FIGS. 5 and 8A).

Since the lower end portion of the intake guide surface 11a is spaced from the upper end portion of the exhaust guide surface 12a with a predetermined distance D, the port opening unit 30 may be moved along the vertical support surface 11b (or 12b) within the predetermined distance D so that the intake port 21 and the exhaust port 22 are remained in a blocked state.

Hereinafter, an operation of the air spring for a cab of a heavy truck with automatic height adjustment according to various exemplary embodiments of the present invention, which has the above-described configuration, will be described below.

Figure 8B:
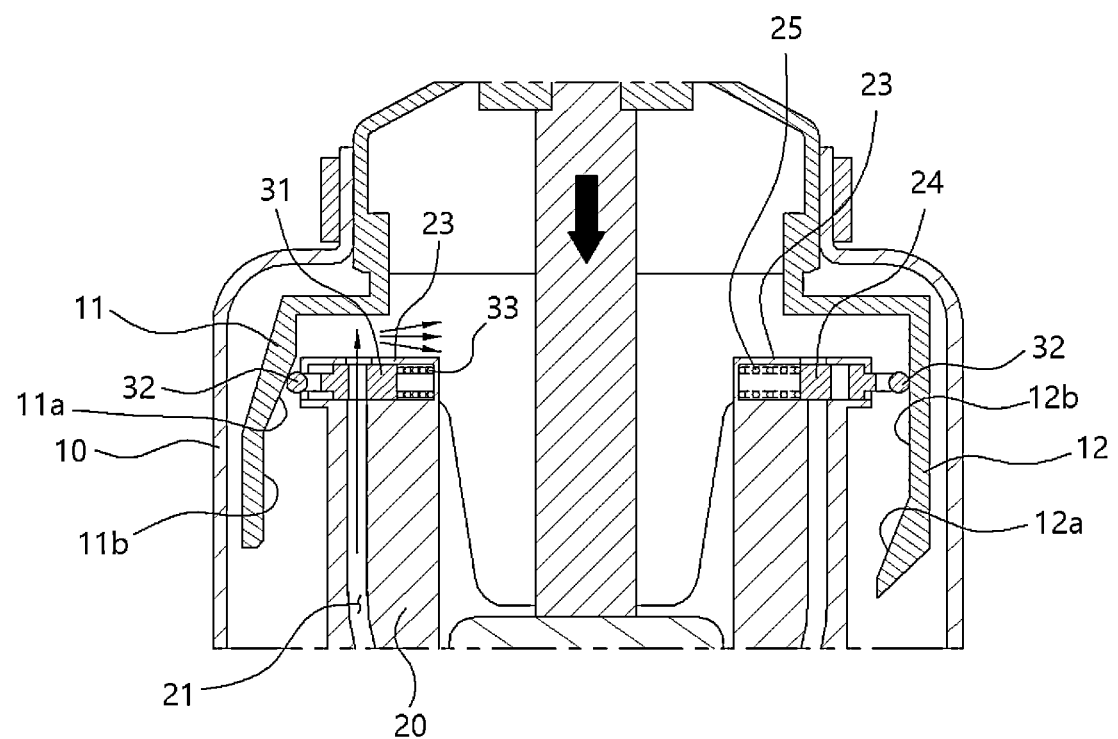
Figure 8C:
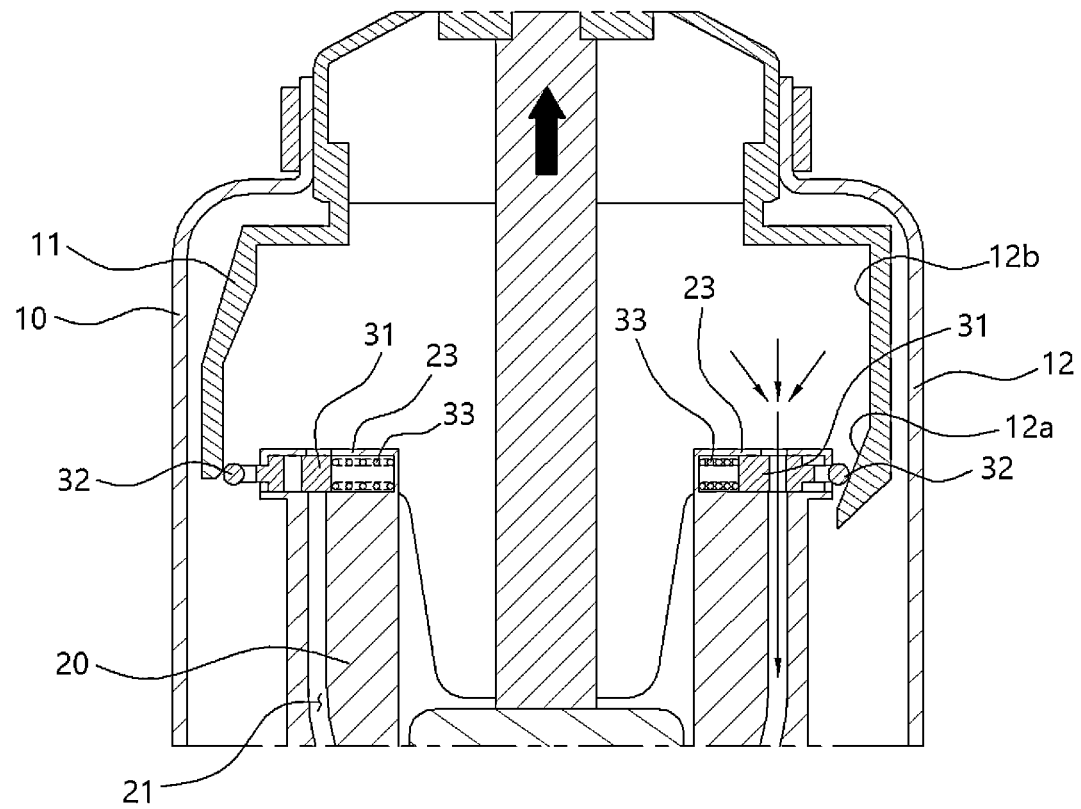

Each of FIG. 8A, FIG. 8B and FIG. 8C illustrates a state of the air spring 1 according to a height of the cab.

First, FIG. 8A illustrates a case in which the height of the cab is located within an appropriate range.

When the height of the cab is within the appropriate range, the port opening units 30 are located in a section D between the lower end portion of the intake guide surface 11a and the upper end portion of the exhaust guide surface 12a. The port opening units 30 are in a state of blocking the intake port 21 and the exhaust port 22, and there may be no entry and exit in the air spring 1.

FIG. 8B illustrates a state in which the cab descends.

The state in which the cab descends is a state in which the pressure inside the air spring 1 is lowered, and thus the canister 10 may descend.

When the canister 10 descends, the intake guide 11 and the exhaust guide 12 may also descend together with the canister 10.

When the intake guide 11 descends, the roller 32 may enter the intake guide surface 11a from the first support surface 11b in the port opening unit 30 on the side of the intake port 21. Since the intake guide surface 11a is an inclined surface, the intake guide surface 11a may press the roller 32 and the rod 31 to be moved inward the holder 23. As the canister 10 and the intake guide 11 descend, the rod 31 may be further moved inward the holder 23, and thus the communication hole 31a may communicate with the intake port 21. When the communication hole 31a communicates with the intake port 21, a passage through which air pressed from an air pump is configured for being introduced into the air spring 1 may be formed. Accordingly, the pressure of the air spring 1 may be increased, and thus the canister 10 and the cab may be raised to an appropriate height.

Meanwhile, when the exhaust guide 12 descends together with the intake guide 11, the roller 32 may be maintained in a state of coming into contact with the second support surface 12b of the exhaust guide 12 in the port opening unit 30 on the side of the exhaust port 22. Accordingly, the port opening unit 30 on the side of the exhaust port 22 consistently may block the exhaust port 22.

As described above, when the air is supplied to the inside of the air spring 1 from the outside thereof through the intake port 21, the pressure of the air spring 1 may be increased, and the canister 10 may ascend from a descending state.

When the canister 10 ascends to an appropriate height, the roller 32 may enter the first support surface 11b from the intake guide surface 11a even in the port opening unit 30 on the side of the intake port 21, and the rod 31 may be moved forward to block the intake port 21 again.

FIG. 8C illustrates a state in which the pressure in the air spring 1 is higher than an appropriate level, and the cab is raised.

When the pressure of the air spring 1 is high, the canister 10 may ascend.

Due to the ascending of the canister 10, the intake guide 11 and the exhaust guide 12 also may ascend.

Even when the intake guide 11 ascends, since the roller 32 of the port opening unit 30 on the side of the intake port 21 may travel on the first support surface 11b, the roller 32 may not be moved inward the holder 23 and may be maintained at its position, being maintained in a state of blocking the intake port 21.

On the other hand, when the exhaust guide 12 ascends, the roller 32 may enter the exhaust guide surface 12a from the second support surface 12b in the port opening unit 30 on the side of the exhaust port 22. Since the exhaust guide surface 12a is formed as an inclined surface, when the canister 10 and the exhaust guide 12 ascend in a state in which the roller 32 may come into contact with the exhaust guide surface 12a, the roller 32 may enter the exhaust guide surface 12a from the second support surface 12b. When the canister 10 ascends in the state in which the roller 32 may come into contact with the exhaust guide surface 12a, the exhaust guide surface 12a may press the roller 32 and the rod 31 toward a center portion of the piston 20. Accordingly, the rod 31 may slide inside the holder 23, and when the sliding distance is increased, the exhaust port 22 may communicate with the communication hole 31a. When the exhaust port 22 and the communication hole 31a are connected to each other, a portion of the air in the air spring 1 may be discharged to the outside through the exhaust port 22.

When the air in the air spring 1 is discharged to the outside to some extent, the pressure in the air spring 1 may be decreased, and thus the canister 10 may start to descend again. As described above, as the pressure in the air spring 1 is decreased, when the canister 10 descends again and thus the inside of the air spring 1 reaches an appropriate pressure, the roller 32 may enter the second support surface 12b from the exhaust guide surface 12a, and the rod 31 may block the exhaust port 22 to maintain an appropriate pressure state.

In accordance with an air spring for a cab of a heavy truck with automatic height adjustment according to various exemplary embodiments of the present invention, which has the above-described configuration, a configuration for supplying air into the air spring or discharging air therefrom may be integrated into the air spring so that the number of parts may be reduced.

Furthermore, when a truck is manufactured, a pressure of the air spring and a height of the cab may be automatically adjusted only by installing the air spring and connecting an air line without installing a configuration for supplying or discharging air in the air spring so that an amount of work required may be reduced.

Due to the reduction in the number of parts and the amount of work required, a reduction in production cost may be achieved.

Furthermore, since a configuration for supplying and discharging air is not exposed to the outside, a failure of the air spring 1 due to foreign materials may be reduced.

In accordance with various aspects of the present invention, a configuration for supplying air into an air spring 1 or discharging air therefrom may be integrated into the air spring so that there may be an effect in that reduction of the number of parts, a production cost and a failure of the air spring may be achieved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air spring apparatus for a cab of a truck with automatic height adjustment, which is provided between the cab and a frame of the truck and supports the cab with a pressure of air filling in the air spring apparatus, the air spring apparatus comprising:
   a canister in which an internal space is formed;
   a guide provided within the internal space of the canister;
   a piston movably mounted in the internal space of the canister and configured to ascend and descend relative to the canister, wherein the piston includes an intake port and an exhaust port,
   port opening units provided adjacent to the intake port and the exhaust port of the piston, respectively and configured to come into contact with the guide,
   wherein when the cab ascends or descends, each of the port opening units is operated by the guide on which an inclined surface is formed in the canister to open either the intake port or the exhaust port.

2. The air spring apparatus of claim 1, wherein the guide includes:
   an intake guide including an intake guide surface inclined outward the canister toward a lower side of the canister; and
   an exhaust guide including an exhaust guide surface inclined inward the canister toward the lower side of the canister,
   wherein the intake guide surface is located at a position which is higher than a position of the exhaust guide surface.

3. The air spring apparatus of claim 2,
   wherein the intake guide further includes a first support surface formed downwardly from a lower end portion of the intake guide surface in an ascending and descending direction of the piston; and
   wherein the exhaust guide further includes a second support surface formed upwards from an upper end portion of the exhaust guide in an ascending and descending direction of the piston.

4. The air spring apparatus of claim 2, wherein a lower end portion of the intake guide surface is spaced from an upper end portion of the exhaust guide surface with a predetermined distance.

5. The air spring apparatus of claim 2, wherein the intake guide is spaced from the exhaust guide by a predetermined interval.

6. The air spring apparatus of claim 1, wherein each of the intake port and the exhaust port includes a holder configured to accommodate a corresponding port opening unit and formed in the piston to intersect the intake port and the exhaust port.

7. The air spring apparatus of claim 6, wherein each of the port opening units includes:
   a rod slidably provided in inside of the holder and including a communication hole configured for fluidically communicating with the intake port or the exhaust port according to a sliding position of the rod; and
   a spring elastically support the rod toward the guide.

8. The air spring apparatus of claim 7, wherein each of the port opening units further includes a roller disposed at an end portion of the rod and configured to come into contact with the guide.

9. The air spring apparatus of claim 1, wherein each of the port opening units is provided above each of the intake port and the exhaust port.

10. The air spring apparatus of claim 9, wherein the port opening units provided on the intake port and the exhaust port side are located at a same height.

11. The air spring apparatus of claim 1,
   wherein the intake port and the exhaust port are formed in the piston in an ascending and descending direction of the piston; and
   wherein each of the port opening units is provided to be adjacent to an upper end portion of the piston.

12. A vehicle comprising:
   a cab with an air spring apparatus with automatic height adjustment, which is provided between the cab and a frame of the vehicle and supports the cab with a pressure of air filling in the air spring apparatus, the air spring apparatus comprising:
   a canister in which an internal space is formed;
   a guide provided within the internal space of the canister;
   a piston movably mounted in the internal space of the canister and configured to ascend and descend relative to the canister, wherein the piston includes an intake port and an exhaust port, and
   port opening units provided adjacent to the intake port and the exhaust port of the piston, and configured to come into contact with the guide, respectively,
   wherein the guide includes:
      an intake guide including an intake guide surface inclined outward the canister toward a lower side of the canister; and
      an exhaust guide including an exhaust guide surface inclined inward the canister toward the lower side of the canister,
   wherein when the cab ascends or descends, each of the port opening units is operated by the intake guide and the exhaust guide to open either the intake port or the exhaust port, and
   wherein the intake guide surface and the exhaust guide surface have unsymmetrical profiles to each other.

13. The air spring apparatus of claim 12, wherein the intake guide surface is located at a position which is higher than a position of the exhaust guide surface.

14. The air spring apparatus of claim 13,
   wherein the intake guide further includes a first support surface formed downwardly from a lower end portion of the intake guide surface in an ascending and descending direction of the piston; and
   wherein the exhaust guide further includes a second support surface formed upwards from an upper end portion of the exhaust guide in an ascending and descending direction of the piston.

15. The air spring apparatus of claim 13, wherein a lower end portion of the intake guide surface is spaced from an upper end portion of the exhaust guide surface with a predetermined distance.

16. The air spring apparatus of claim 15, wherein the port opening units provided on the intake port and the exhaust port side are located at a same height.

17. The air spring apparatus of claim 12, wherein each of the intake port and the exhaust port includes a holder configured to accommodate a corresponding port opening unit and formed in the piston to intersect the intake port and the exhaust port.

18. The air spring apparatus of claim 17, wherein each of the port opening units includes:

a rod slidably provided in inside of the holder and including a communication hole configured for fluidically communicating with the intake port or the exhaust port according to a sliding position of the rod; and a spring elastically support the rod toward the guide.

19. The air spring apparatus of claim 18, wherein each of the port opening units further includes a roller disposed at an end portion of the rod and configured to come into contact with the guide.

20. The air spring apparatus of claim 12, wherein the intake port and the exhaust port are formed in the piston in an ascending and descending direction of the piston; and wherein each of the port opening units is provided to be adjacent to an upper end portion of the piston.

* * * * *